United States Patent [19]

Misawa

[11] Patent Number: 4,754,662
[45] Date of Patent: Jul. 5, 1988

[54] VEHICLE TRANSMISSION WITH REVERSING MECHANISM

[75] Inventor: Mitsukuni Misawa, Suginami, Japan

[73] Assignee: Honda Giken Kogyo Kabushiki, Japan

[21] Appl. No.: 872,968

[22] Filed: Jun. 11, 1986

[30] Foreign Application Priority Data

Jun. 19, 1985 [JP] Japan ............... 60-92521[U]

[51] Int. Cl.⁴ .............................. F16H 57/06
[52] U.S. Cl. ...................... 74/476; 74/337.5
[58] Field of Search ............ 74/476, 474, 337.5

[56] References Cited

U.S. PATENT DOCUMENTS

| | | | |
|---|---|---|---|
| 4,275,614 | 6/1981 | Okubo et al. | 74/476 |
| 4,455,884 | 6/1984 | Tsuruta et al. | 74/474 X |
| 4,624,350 | 11/1986 | Akashi | 74/476 X |
| 4,635,506 | 1/1987 | Imaizumi et al. | 74/476 X |

FOREIGN PATENT DOCUMENTS

| | | | |
|---|---|---|---|
| 57-161340 | 10/1982 | Japan | 74/476 |
| 57-167553 | 10/1982 | Japan | 74/337.5 |
| 58-50346 | 3/1983 | Japan | 74/337.5 |

*Primary Examiner*—Leslie A. Braun
*Assistant Examiner*—Dwight G. Diehl
*Attorney, Agent, or Firm*—Darby & Darby

[57] ABSTRACT

A transmission for an automotive vehicle includes a gearing mechanism, and a gear ratio of the gearing mechanism is shifted in accordance with an angular movement of a gear shift drum. The transmission also includes a reverse mechanism by which the transmission is shifted to a reverse state via a reverse gear shift device in accordance with the angular movement of the shift drum. A lock mechanism is provided for limiting the angular movement of the shift drum to prevent the transmission from being shifted to its reverse state. The gearing mechanism, the reverse mechanism and the reverse gear shift device constitute transmission mechanisms. These transmission mechanisms and the lock mechanism are disposed on opposite sides of the shift drum.

4 Claims, 4 Drawing Sheets

VEHICLE TRANSMISSION WITH REVERSING MECHANISM

BACKGROUND OF THE INVENTION

1. Field of the Invention

This invention relates generally to a transmission mechanism for a motorcycle or the like and particularly to such a transmission incorporating a reverse mechanism by which the motorcycle can be move rearwardly.

2. Prior Art

A typical example of conventional transmissions for motorcycles comprises a shift drum having cam grooves formed in an outer peripheral surface thereof, and shift forks mounted on a shaft for sliding movement therealong and received at one ends respectively in the cam grooves. The other ends of the shift forks are engaged with shifters or shift collars mounted on a main shaft and a countershaft, and input and output gears are mounted on the main shaft and the countershaft, respectively. In operation, a gear shift pedal is operated to angularly move the shift drum, so that the shifters are moved by the coacting shift forks to drivingly connect the main shaft and the countershaft together through the meshed input and output gears, thereby transmitting the rotation of a crankshaft of an engine of the motorcycle to the countershaft at a selected gear ratio, the countershaft having a drive sprocket around which a drive chain extends to drive a rear wheel of the motorcycle in a well known manner.

A transmission of this type has also been employed in a motorcycle having three or four wheels, and in some cases such a transmission is provided with a reverse mechanism so that the three or four-wheeled motorcycle can be moved rearwardly. Japanese Patent Application Laid-Open (Kokai) No. 57-161340 discloses such a transmission of the type having a lock mechanism for normally preventing the transmission from being inadvertently shifted into a reverse state. In this conventional transmission, the input and output gears, the shift forks and the lock mechanism are all disposed above the shift drum, and they are spaced from one another so as not to interfere with one another. Therefore, the transmission is rather space-consuming and extends considerably from the opposite sides of a frame or a body of the motorcycle, and as a result the overall width of the motorcycle is increased.

SUMMARY OF THE INVENTION

It is therefore an object of this invention to provide a transmission with a reverse mechanism which will not unduly increase an overall width of a motorcycle.

According to the present invention, there is provided a transmission comprises:

(a) a housing;
(b) an input shaft mounted on said housing for rotation about an axis thereof;
(c) a plurality of forward input gears mounted on said input shaft;
(d) an output shaft mounted on said housing in parallel relation to said input shaft and mounted on said housing for rotation about an axis thereof;
(e) a plurality of forward output gears mounted on said output shaft and meshingly engaging respectively with said forward input gears;
(f) a shift drum of a generally cylindrical shape mounted on said housing for angular movement about an axis thereof and disposed in parallel relation to said output shaft;
(g) forward gear shift means responsive to the angular movement of said shift drum for transmitting the rotation of said input shaft to said output shaft at different gear ratios through said meshed input and output gears to rotate said output shaft in one direction;
(h) a reverse mechanism comprising an interconnecting reverse gear mounted on said housing for rotation about an axis parallel to said input shaft, a reverse input gear mounted on said input shaft, a reverse output gear mounted on said output shaft, and reverse gear shift means operatively engaged with said shift drum and being movable in response to the angular movement of said shift drum into an operative position so as to meshingly engage said interconnecting reverse gear with said reverse input and output gears and to drivingly connect said input and output shafts together through these meshed reverse gears to thereby rotate said output shaft in the other direction;
(i) lock means for limiting the angular movement of said shift drum to thereby prevent said reverse gear shift means from moving into said operative position, thereby preventing said output shaft from being rotated in the other direction, said input and output shafts; and
(j) means operable to release the limiting of the angular movement of said shift drum by said lock means;
(k) said forward input and output gears, said forward gear shift means and said reverse mechanism constitute transmission elements, said transmission elements and said lock mechanism being disposed on opposite sides of said shift drum.

DESCRIPTION OF THE PREFERRED EMBODIMENT OF THE INVENTION

Figure 1:
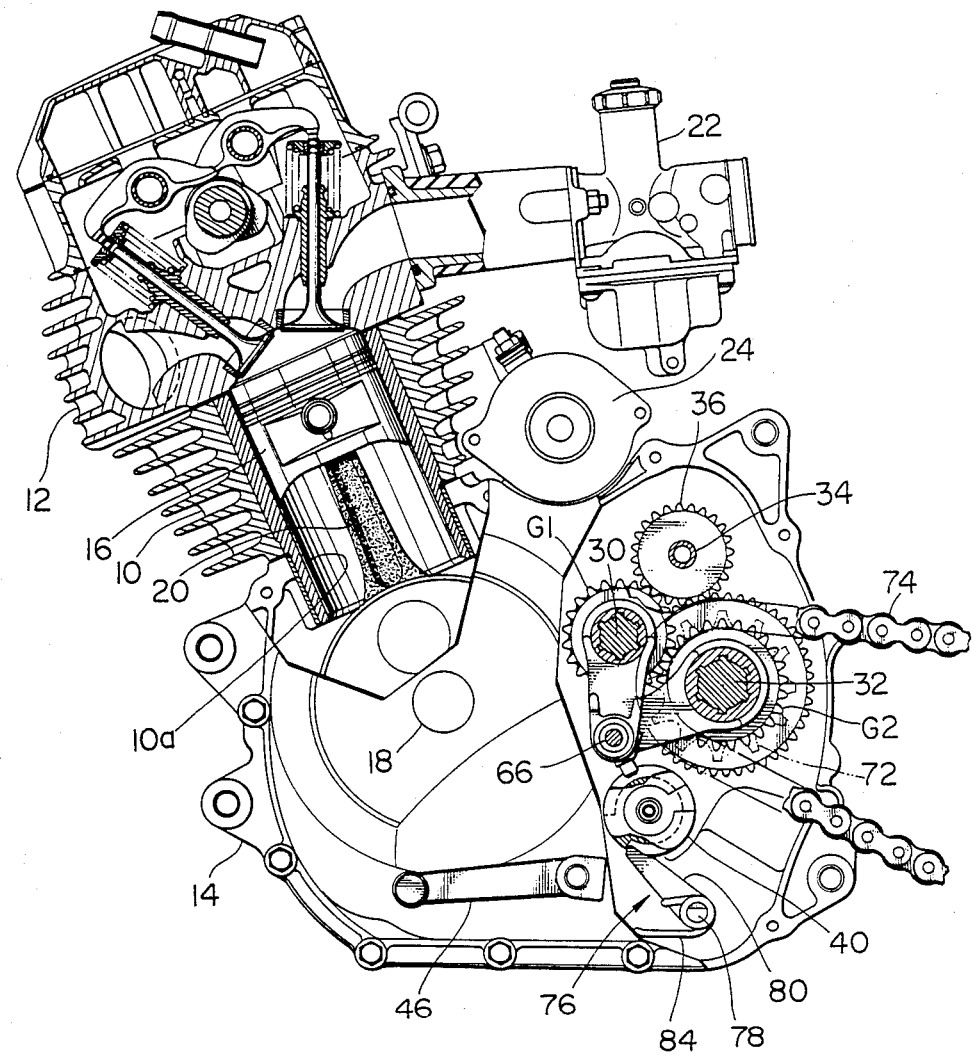
FIG. 1 is a cross-sectional view of an internal combustion engine for a motorcycle incorporating a transmission provided in accordance with the present invention.

FIG. 1 shows an internal combustion engine for a motorcycle having three or four wheels, the engine broadly comprises a cylinder block 10 having a cylinder head 12 thereon, a crankcase 14 secured to the cylinder block 10, a piston 16 received in a cylinder 10a in the cylinder block 10, a crankshaft 18 operatively connected to the piston 16 via a connecting rod 20, a carburetor 22, and a starter 24.

The engine also comprises a transmission 28 which includes a main or input shaft 30 having a plurality of forward input gears G1 mounted thereon, a countershaft or output shaft 32 disposed parallel to the main shaft 30 and having a plurality of forward output gears G2 mounted thereon, an idler shaft 34 disposed parallel to the two shafts 30 and 32, and an interconnecting reverse gear 36 fixedly mounted on the idler shaft 34. The crankcase 14 serves as a housing for the transmission 28. These three shafts 30, 32 and 34 are journalled in walls of the crankcase 14 for rotation about their respective axes. The forward input gears G1 on the main shaft 30 are in mesh with the forward output gears G2 on the countershaft 32, respectively, these gears being accommodated in a transmission chamber 38 in the crankcase 14. A shift drum 40 of a cylindrical shape is also mounted within the transmission chamber 38 for rotation or angular movement about a longitudinal axis thereof, the shift drum 40 being disposed below the main shaft 30 and the countershaft 32 in parallel relation thereto. The shift drum 40 is disposed transversely of a frame or body (not shown) of the motorcycle. A reverse input gear G1A is also mounted on the main shaft 30, and a reverse output gear G2A is also mounted on the countershaft 32.

A rotatable gear shift spindle 42 is disposed below the shift drum 40 in parallel relation thereto, one end portion of the shift spindle 42 extends exteriorly of the crankcase 14 while the other end portion extends into a shift chamber 44 in the crankcase 14. A shift pedal 46 to be operated by the foot of a driver or rider is connected to the shift spindle 42 via an arm 48 secured to the end of the shift spindle 42 extending outwardly from the crankcase 14. Linkage means 50 is provided in the shift chamber 44 for angularly moving the shift drum 40 in response to the operation of the shift pedal 46.

The linkage means 50 comprises an engaging member 52 having a projection 52a and fixedly mounted on the gear shift spindle 42 for rotation therewith, a master arm 54 having a tubular portion 54a rotatably fitted on the shift spindle 42, a drum shifter or reversible ratchet 56 connected to one end of the shift drum 40 and having a plurality of pins on one face thereof and spaced a predetermined pitch, a shift plate 58 disposed between the master arm 54 and the ratchet 56 and having a pair of claws (not shown), a spring 60 acting between the master arm 54 and the shift plate 58 for urging one of the claws of the shift plate 58 into engagement with one of the pins of the ratchet 56, and a return spring 62 mounted on the gear shift spindle 42. The master arm 54 has a pin (not shown) engaged or received in a slot (not sown) of the shift plate 58. With this arrangement, upon operation of the shift pedal 46, the gear shift spindle 42 is angularly moved together with the master arm 54 and the shift plate 58, so that the drum shifter or ratchet 56 is angularly moved together with the shift drum 40 through a predetermined angle corresponding to the pitch of the pins of the ratchet 56 through the engagement of the claw of the shift plate 58 with the pin on the ratchet 56. A pin 64 engages with the master arm 54 and the return spring 62 and limits the angular movement of the master arm 54. Upon angular movement of the ratchet 56 through the predetermined angle, the master arm 54 is returned to its initial position together with the gear shift spindle 42 under the influence of the return spring 62.

A shift fork guide shaft 66 is mounted within the transmission chamber 38 and is disposed between the two shafts 30, 32 and the shift drum 40 in parallel relation thereto. Three peripheral cam grooves 40a are formed in the outer peripheral surface of the shift drum 40 and spaced from one another along the longitudinal axis of the drum 40. Three shift forks 68 are mounted on the guide shaft 66 for sliding movement therealong, each of the three shift forks 68 having at a lower end thereof a projection 68a slidably received in a respective one of the cam grooves 40a in the shift drum 40, so that upon angular movement of the shift drum 40, the shift forks 68 are moved along the guide shaft 66. The main shaft 30 and the countershaft 32 have splined portions, and flanged shifter or shift collars 70 are mounted on the splined portions of these shafts 30 and 32 for rotation with the respective shafts 30 and 32 and for sliding movement therealong. The upper ends of the shift forks 68 are bifurcated and fitted respectively on the shift collars 70. In response to the angular movement of the shift drum 40, each of the shift collars 70 is urged by the coacting shift fork 68 to move along the mating shaft 30, 32 to drivingly connect the forward gear G1, G2 to the mating shaft, thereby transmitting the rotation of the crankshaft 14 to the countershaft 32 at a selected one of gear ratios in a normal direction. A drive sprocket 72 is fixedly mounted on one end of the countershaft 32, and an endless drive chain 74 extends around the drive sprocket 72 and a driven sprocket (not shown) fixedly mounted on a rear axle for driving rear wheels for rotation.

In response to the angular movement of the shift drum 40, the shift forks 68 for the reverse input and output gears G1A and G2A are moved into their respective operative positions so as to meshingly engage the interconnecting reverse gear 36 with the reverse input and output gears G1A and G2A and to drivingly connect the main shaft 30 and the countershaft 32 together through these three meshed gears and the coacting shift collars 70, thereby rotating the countershaft 30 in a reverse direction to move the motorcycle rearwardly. Thus, these reverse gears G1A, G2A and 36 and their coacting shift forks 68 and shift collars 70 constitute a reverse mechanism.

Figure 2:
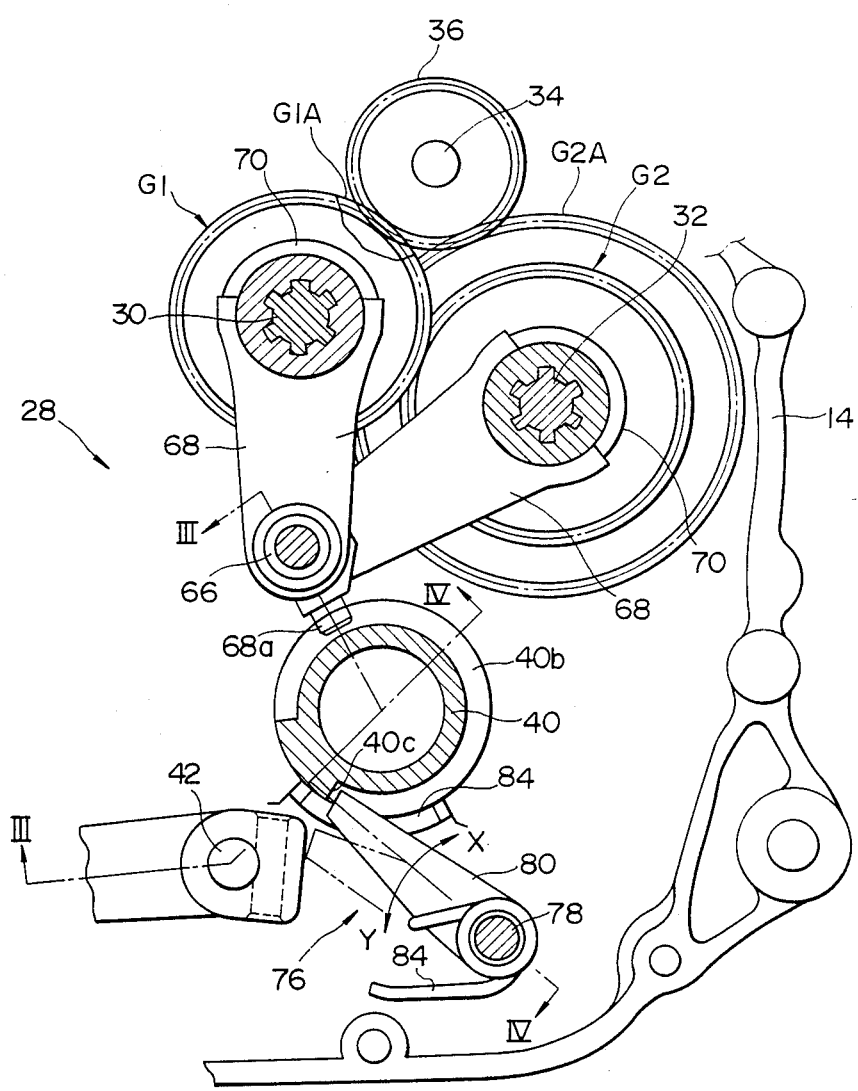
FIG. 2 is a cross-sectional view of the transmission.
Figure 3:
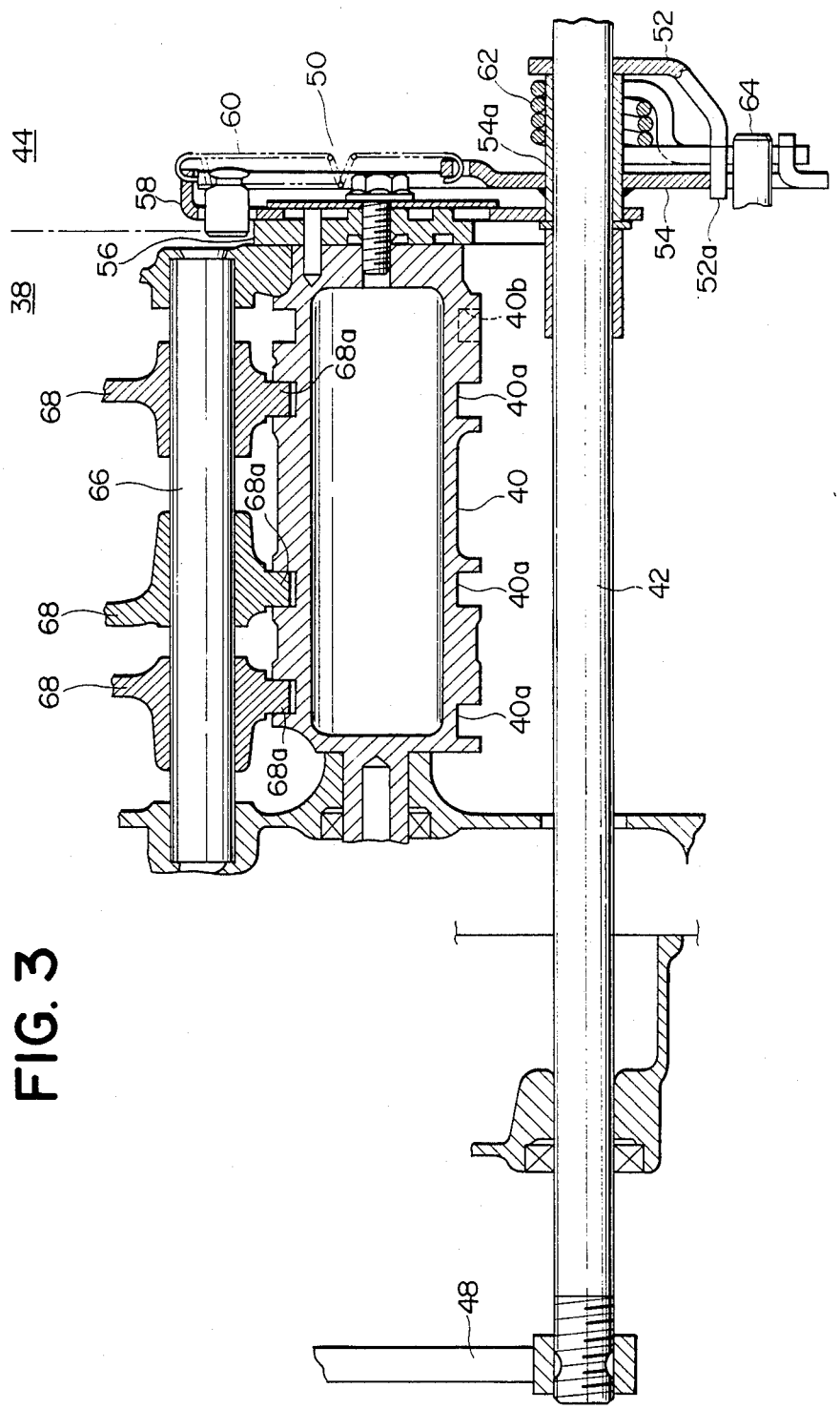
FIG. 3 is a cross-sectional view taken along the line III—III of FIG. 2.
Figure 4:
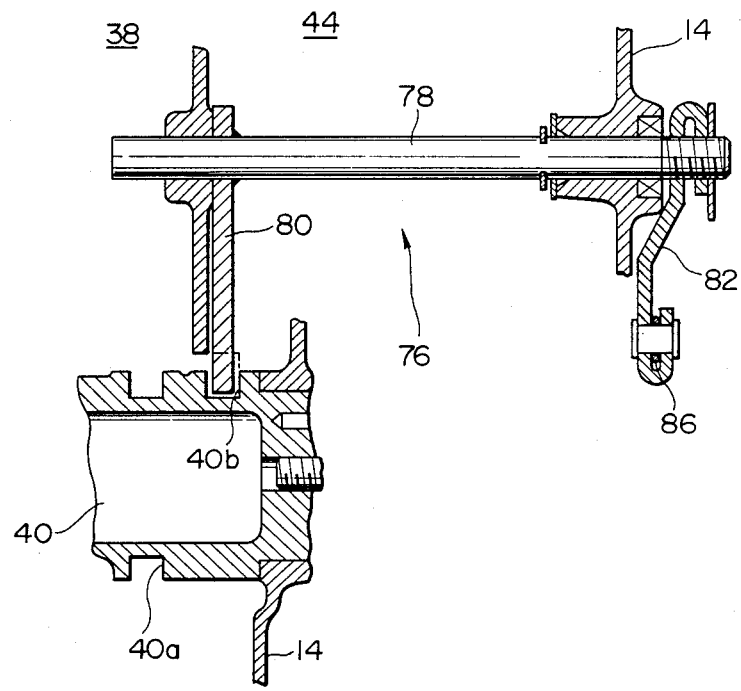
FIG. 4 is a cross-sectional view taken along the line IV—IV of FIG. 2.

A lock mechanism 76 is provided for limiting the angular movement of the shift drum 40 so that the reverse input and output gears G1A and G2A are prevented from being brought into meshing with the interconnecting reverse gear 36. More specifically, the lock mechanism 76 comprises a shaft 78 disposed parallel to and below the shift drum 40 and journalled in the walls of the crankcase 14 for rotation about an axis thereof, a detent arm 80 fixedly mounted at one end on the shaft 78 by welding and disposed perpendicular to the shaft 78, a lever 82 secured on one end of the shaft 78 transversely thereof, and a spring 84 mounted on the shaft 78 and acting on the detent arm 80 for normally urging the detent arm 80 in a direction indicated by an arrow X in FIG. 2. so that the distal end portion of the detent arm 80 is received in the groove 40b for sliding movement therealong. The shift drum 40 has a detent groove 40b formed in the outer peripheral surface thereof and extending circumferentially of the shift drum 40 over a given length. One end wall 40c of the detent groove 40b extending along the longitudinal axis of the shift drum 40 serves as an abutment surface against which the distal end of the detent arm 80 is engageable. An operating wire 86 is secured at one end to the lever 82 and is also connected at the other end to a manipulating means (not shown) mounted on the motorcycle at a position easily accessible by the driver such as a handle of the motorcycle. With this arrangement, upon manipulating or pulling the operating wire 86, the shaft 78 is angularly moved about its axis together with the detent arm 80 via the lever 82. Formed in the wall of the crankcase 14 is a notch or opening through which the distal end portion of the detent arm 80 extends from the shift chamber 44 into the transmission chamber 38 (FIG. 4).

Thus, the detent arm 80 is normally held in the detent groove 40b and even if the shift pedal 46 is operated so as to shift the transmission 28 to the reverse state, the distal end of the detent arm 80 is brought into abutting engagement with the end wall 40c of the detent groove 40b to limit the angular movement of the shift drum 40 to prevent the shift forks 68 for the reverse input and output gears G1A and G2A from being moved into their respective operative positions to prevent the meshing engagement of the interconnecting reverse gear 36 with the reverse input and output gears G1A and G2A. For shifting the transmission 28 to the reverse state, the operating wire 86 is manipulated to be pulled to angular move the detent arm 80 in a direction of Y (FIG. 2) about the shaft 78 out of the detent groove 40b, so that the reverse input and output gears G1A and G2A are brought into meshing engagement with the interconnecting reverse gear 36 and to drivingly connect the main shaft 30 and the countershaft 32 together via the coacting shift collars 70, thereby rotating the countershaft 32 in the reverse direction.

As described above, the transmission components, that is to say, the main shaft 30, the countershaft 32, the input and output gears G1, G2, G1A and G2A, the shift fork guide shaft 66, and the shift forks 68 are disposed above the shift drum 40 while the lock mechanism 76 is disposed below the shift drum 40. In other words, the above-mentioned transmission components and the reverse means 76 are disposed on opposite sides of the shift drum 40, and more specifically the above-mentioned transmission components, the shift drum 40 and the lock mechanism 76 are disposed in overlapping relation when viewed from the top of the transmission 28. Thus, since the lock mechanism 76 is provided below the shift drum 40, the overall width of the motorcycle can be reduced.

While the transmission according to the present invention has been specifically shown and described herein, the invention itself is not to be restricted by the exact showing of the drawings or the description thereof. For example, in the illustrated embodiment, the above-mentioned transmission components are disposed above the shift drum 40 while the lock mechanism 76 is disposed below the shift drum, the above-mentioned transmission components and the lock mechanism 76 may be disposed at generally the same level on the opposite sides of the shift drum. In other words, it will suffice that the shift drum 40 is disposed between the above-mentioned transmission components and the lock mechanism 76.

What is claimed is:

1. A transmission comprising:
   (a) a housing;
   (b) an input shaft mounted on said housing for rotation about an axis thereof;
   (c) a plurality of forward input gears mounted on said input shaft;
   (d) an output shaft mounted on said housing in parallel relation to said input shaft and mounted on said housing for rotation about an axis thereof;
   (e) a plurality of forward output gears mounted on said output shaft and meshingly engaging respectively with said forward input gears;
   (f) a shift drum of a generally cylindrical shaft mounted within said housing for angular movement about an axis thereof and disposed in parallel relation to said output shaft, said shift drum having a circumferential detent groove in its outer peripheral surface near one end thereof, said groove extending circumferentially thereof over a given length, said detent groove being circumferentially interrupted by an end wall, whereby said detent groove is entirely within said housing;
   (g) forward gear shift means responsive to the angular movement of said shift drum for transmitting the rotation of said input shaft to said output shaft at different gear ratios through said meshed input and output gears to rotate said output shaft in one direction;
   (h) a reverse mechanism comprising an interconnecting reverse gear mounted on said housing for rotation about an axis parallel to said input shaft, a reverse input gear mounted on said input shaft, a reverse output gear mounted on said output shaft, and reverse gear shift means operatively engaged with said shift drum and being movable in response to the angular movement of said shift drum into an operative position so as to meshingly engage said interconnecting reverse gear with said reverse input and output gears and to drivingly connect said input and output shafts together through these meshed reverse gears to thereby rotate said output shaft in the other direction;
   (i) lock means extending into said housing and cooperating with said detent means end wall for limiting the angular movement of said shift drum to prevent said reverse gear shift means from moving into said operative position, thereby preventing said output shaft from being rotated in the other direction; and
   (j) means operable to release the limiting of the angular movement of said shift drum by said lock means;
   (k) said input and output shafts, said forward input and output gears, said forward gear shift means and said reverse mechanism constituting transmission elements, said transmission elements and said lock means being disposed on opposite side of said shift drum.

2. A transmission according to claim 1, in which said transmission elements, said lock means and said shift drum are disposed in overlapping relation when viewed from either of said lock means and said transmission elements.

3. A transmission according to claim 1, said lock means comprising a detent arm pivotally mounted at one end on said housing and a urging means acting on said detent arm for normally holding the other end of said detent arm in said detent groove for sliding movement therealong, said other end of said detent arm being engageable with said end wall of said detent groove for limiting the angular movement of said shift drum, said release means being operatively connected to said detent arm and operable to pivotally move said detent arm out of said detent groove to allow a further angular movement of said shift arm to bring said reverse gear shift means into its operative position.

4. A transmission according to claim 3, in which said lock means further comprises a detent shaft mounted on said housing for angular movement about an axis thereof and a lever fixedly mounted on said detent shaft, said detent arm being fixedly mounted on said detent shaft at said one end thereof, said release means comprising an operating wire connected at one end to said lever, whereby upon pulling said operating wire, said detent shaft is angularly moved about its axis, thereby moving said detent arm out of said detent groove against the bias of said urging means.

* * * * *